United States Patent [19]

Penson et al.

[11] Patent Number: 4,784,214

[45] Date of Patent: Nov. 15, 1988

[54] CONTROL SYSTEM FOR A RECREATIONAL VEHICLE'S AIR-CONDITIONING/HEATING UNIT

[76] Inventors: Joe R. Penson, Rt. 4, Box 754, Louisville, Tenn. 37777; Randy H. Alfrey, 1406 Reaves Ave., Knoxville, Tenn. 37912

[21] Appl. No.: 14,363

[22] Filed: Feb. 13, 1987

[51] Int. Cl.[4] .............................. F25B 29/00
[52] U.S. Cl. ........................ 165/25; 236/51
[58] Field of Search ............ 236/1 R, 47, 51; 62/262; 165/25

[56] References Cited

U.S. PATENT DOCUMENTS 3,486,081 12/1969 Kanbar .......................... 236/1 X
4,190,848 4/1980 Falkenstein ................... 236/46 R Primary Examiner—William E. Wayner

[57] ABSTRACT

A secondary control system (10) for a RV's air-conditioning/heating system. Conventional roof-mounted RV heating and cooling units have a primary control for selectively energizing the heating/cooling unit (11). This unit is normally wired through a circuit breaker which supplies power provided by a conventional power line. The present control system (10) includes a switch (20) which selectively energizes the heating-/cooling unit. This switch (20) is controlled by a low voltage control device (30). The control device operates in an override mode such that the primary control associated with the heating/cooling unit (11) serves to energize and de-energize such unit. The control device (10) also includes a thermostatically controlled mode for selectively opening and closing the control switch (20) in response to ambient temperature.

2 Claims, 1 Drawing Sheet

CONTROL SYSTEM FOR A RECREATIONAL VEHICLE'S AIR-CONDITIONING/HEATING UNIT

TECHNICAL FIELD

This invention relates generally to a low voltage control, and more particularly to a control system for a travel trailer or recreational vehicle's air-conditioner and/or heating unit.

BACKGROUND ART

The air-conditioner and/or air-conditioner and heating element combination in recreational vehicles (RV) and travel trailers is generally mounted in the ceiling. The air-conditioning/heating units of conventional design carry a thermostatic control proximate the operational panel of the cooling unit. Since the thermostat is normally mounted near the ceiling, the space used by persons occupying the trailer or RV is generally much cooler than the atmosphere ambient the thermostat. Thus, it is difficult to maintain the occupied space in a RV or travel trailer at a desired and comfortable temperature. Similarly, it is difficult to maintain the occupied space in the RV at a comfortable level when heating elements are used in winter in ceiling mounted units which combine air-conditioning and heating capabilities. Also, conventional fans or blowers associated with RV air conditioners run continuously, and do not cycle with the compressor. The present invention addresses this problem.

Accordingly, it is an object of the present invention to provide a secondary control system for the air-conditioning/heating unit of a RV. This control system is designed to be simple to install and relatively safe to operate since it is especially suitable for low voltage control. The control system can enable the RV user to control the air conditioner/heater from a remote location. Since the low voltage control can be mounted at a selected location, normally proximate the occupied space within the RV or trailer, a more comfortable and predictable temperature can be established than that maintained by a roof-mounted thermostat.

DISCLOSURE OF THE INVENTION

Other objects and advantages of the present invention will in part appear hereinafter, and will be accomplished by a secondary control system for a RV's air-conditioning/heating unit. The control system includes a switch which is preferably connected in series with the air-conditioning/heating unit such that the unit is energized when the switch is closed, and de-energized when the switch is open. A low voltage control device is provided for operating this switch. This control device operates in an override mode which shifts control of the air-conditioning/heating unit to its primary controls normally mounted on the face or operating panel of a conventional unit positioned in the roof. A thermostatically controlled mode serves to selectively open and close the switch in response to temperature ambient the control device. The device's thermostat is generally mounted in the living or occupied area instead of the roof of the RV, and thus provides a more predictable and comfortable temperature within the area used by occupants.

BRIEF DESCRIPTION OF THE DRAWINGS

The above-mentioned features of the present invention will be more clearly understood from consideration of the following description in connection with the accompanying drawings in which.

BEST MODE FOR CARRYING OUT THE INVENTION

Figure 1:
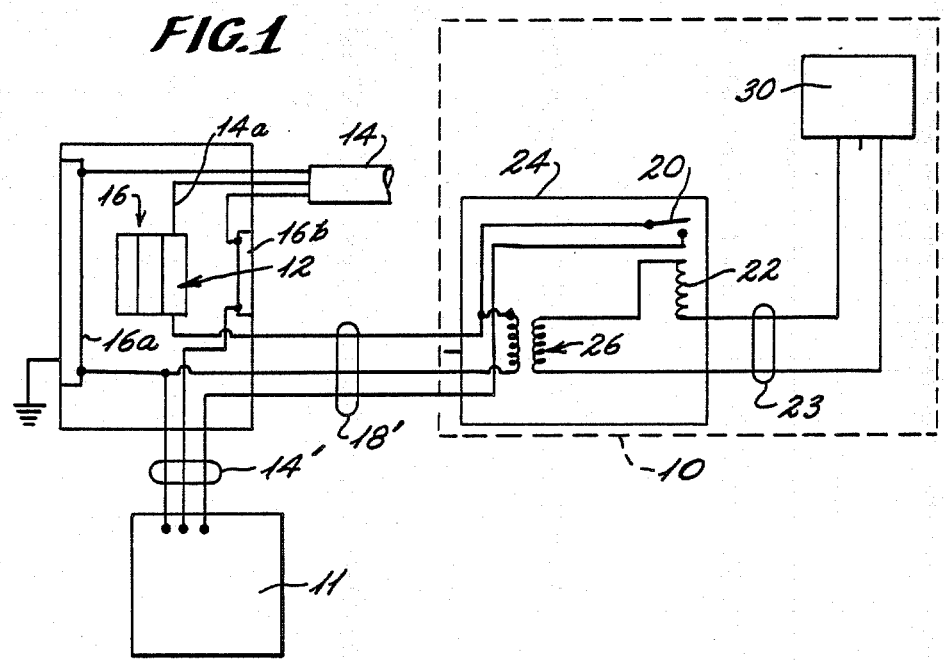
FIG. 1 is a schematic diagram of a control system for a RV's air-conditioning/heating unit incorporating various features of the present invention.

Referring now to the drawings, a control system constructed in accordance with various features of the present invention is illustrated generally at 10 in FIG. 1. The illustrated control system 10 is a low voltage control, and serves as a secondary control for an air-conditioning/heating unit 11 of a RV. It will be noted that certain modern RV air-conditioning units also employ heating strips for winter heating operations. Thus, these units serve as both air-conditioners and heaters, and at times herein referred to as air-conditioners or air-conditioning/heating units. The primary control of the air-conditioning/heating unit 11 is normally mounted together with the air-conditioning/heating unit on the roof of the RV or travel trailer. Thus, the thermostat controls the temperature at the roof level rather than the level used by an occupant of the RV or travel trailer.

The control system 10 is designed to be readily installed. To this end, it is wired to the air-conditioning/heating circuit breaker 12 as shown in FIG. 1. This circuit breaker is fed through a conventional power line 14 which is normally 110 volts AC. This power line 14 normally terminates at the breaker blocks 16. The air-conditioning leads 14' are connected directly to the power line leads 14 illustrated in FIG. 1 at suitable blocks 16, 16A and 16B. As shown in FIG. 1, the power line 14 is rewired such that leads 18' are fed or connected to the control system 10. These leads 18' actually define a single path which passes through the control system and is connected to lead 14' feeding the air-conditioning/heating unit.

More specifically, the control system 10 includes a switch 20 which serves to selectively connect lead 18' and lead 14'. This switch 20 is closed when the air-conditioning/heating unit 11 is energized, and is opened when the air-conditioning/heating unit is de-energized. As shown in FIG. 1, it is connected in series with the air-conditioning/heating unit fed by lead 14A.

In the preferred embodiment, the switch 20 is opened and closed by a relay solenoid 22 illustrated diagrammatically in FIG. 1. This relay, when energized, serves to close switch 20 (the relay contacts) and apply power to the air-conditioning/heating unit. When the relay 22 is de-energized, switch 20 is opened (as by a spring bias of conventional design) and power is terminated thereby de-energizing the air-conditioning/heating unit. It will be noted in FIG. 1 that the relay 22 is housed in housing 24 which also houses a step-down transformer 26 that serves to convert the power supplied from the input lead of the leads 18' to a low voltage which is used to control the energization and de-energization of relay 22 and accordingly controls the operation of switch 20 which serves to turn the air-conditioning/heating unit on and off. One suitable relay and transformer combination 24 which serves the purposes of the present invention is Model 8A05A-1 manufactured by White-Rodgers Division of Emerson Electric Co., St. Louis, Mo.

In the preferred embodiment, the control 10 includes a low voltage control device 30. This device 30 serves to selectively energize and de-energize the relay 22 in the depicted embodiment. More specifically, the control device 30 comprises an override switch mechanism, illustrated at 32 (see FIG. 2). This switch 32, when closed, applies continuous low voltage power to the relay 22 through leads 23. In this override mode of operation, terminal 34 and 36 are connected, and with the relay energized, continuous power is supplied to the air-conditioning/heating unit 11 since switch 20 remains closed. Thus, the control system 10 is by-passed, and the air-conditioning/heating unit will be controlled by the primary controls mounted on the face panel of such unit. Preferably, the switch 32 comprises a single-pole, single-throw switch which, as described briefly above, connects terminals 34 and 36 when the switch is closed.

Figure 2:
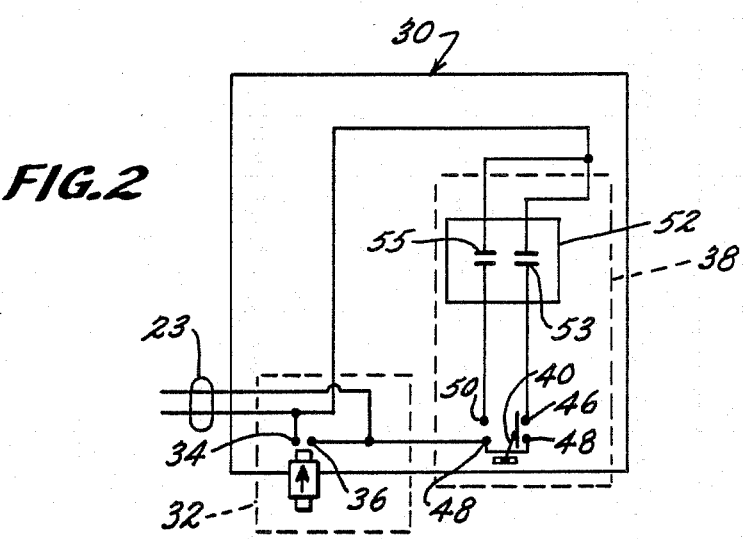
FIG. 2 illustrates a wiring diagram of a control portion of the system.

When the switch 32 is open, control of the air-conditioning/heating unit is shifted to a thermostatically controlled switch 38. This switch 38 comprises a double-pole, double-throw switch as illustrated at 40 in FIG. 2. When this is opened, as shown in FIG. 2, no low voltage is applied to the relay 22 such that it remains de-energized. Thus, the air-conditioning/heating unit is maintained in a stored condition since no current will be applied thereto. The double-pole, double-throw switch 40 can be closed such that terminal 46 and 48 are connected. In this condition, power can be made available to the relay 22, but the relay is still controlled by the thermostat device 52. More specifically, when terminals 46 and 48 are connected, the thermostat device 52 can be adjusted such that the air-conditioning unit/heating will be turned on when preselected temperatures are reached. In a similar manner, when the switch 40 is positioned such that terminals 48 and 50 are connected, and terminals 48 and 46 are disconnected, the heating elements of the air-conditioning/heating unit are controlled by the control system 10. The thermostat device 52 then serves to control the energization and de-energization of the relay 22 such that the heating elements in the air-conditioning/heating unit can be turned on and off. To this end, the contacts 53 and 55 are selectively opened and closed in response to the temperature sensitive thermostat device 52 of conventional design. The thermostat device 52 is preferably positioned within the RV or travel trailer at a location such that the temperature proximate the area or level of the travel trailer occupied is the area which is controlled.

From the foregoing detailed description, it will be recognized by those skilled in the art that an improved device has been provided for controlling an air conditioner, and an air conditioner with heating strips, commonly used in RV's and travel trailers, and mounted in the roofs thereof. More specifically, the device of the present invention is designed such that it can be readily installed in kit form, or provided as optional equipment on a new RV. The system uses low voltage control which enhances its safety features. Further, the device includes an override operational mode which allows the control of the air-conditioning/heating unit to be shifted to the primary or standard controls mounted on the face panel thereof. It also allows for the occupied area of the trailer to be controlled rather than the roof area.

Thus, although there has been described to this point particular embodiments of the present invention of a control device for the air-conditioning/heating unit of a RV, it is not intended that such specific references be considered as limitations upon the scope of the invention except so far as set forth in the following claims and the equivalents thereof.

We claim:

1. A secondary control system for a RV's air-conditioning/heat unit having a primary control at said unit for selectively energizing said heat/cooling unit and having a circuit breaker through which power is supplied to said air-conditioning/heating unit from a conventional power line, said secondary control system comprising:

switch means provided with an AC voltage reduction means, said voltage reduction means having an input connected to said circuit breaker, and a low voltage output, said switch means further provided with an electromagnetic relay having a normally open contract, said contract connected in series with said unit such that said unit is energized when said contact is closed and said unit de-energized when said contact is open; and low voltage control means connected to said output of said voltage reduction means for placement in said RV at a selected location removed from said primary control to regulate air-conditioning/heating at said selected location, said low voltage control means connected to said relay for selectively opening and closing said normally open contact, said low voltage control means including an override means for manually closing said contact to shift control of said unit to said primary control, and an alternatively operable thermostatically controlled means for selectively opening and closing said contact in response to the temperature ambient said secondary control means.

2. A secondary control system for the air-conditioning/heat unit of a RV, said air-conditioning/heating unit including a primary control at said unit for automatically adjusting the temperature ambient said unit, and a circuit breaker through which power is suppled to said air-conditioning/heating unit from a power line, said secondary control system comprising:

switch means provided with a transformer having a primary winding connected to said circuit breaker, and a voltage reducing secondary winding, said switch means further provided with an electromagnetic relay having a coil connected in series with said secondary winding and a normally open contact, said contact being operable by said coil, said contact connected in series with said unit such that said unit is energized when said contact is closed and said unit is de-energized with said contact is open; and a low voltage control connected to said coil and said secondary winding for placement in said RV at a selected location removed from said primary control to regulate air-conditioning/heating at said selected location, said low voltage control including a single-pole single-throw override switch which energized said coil to close said contact and supply power to said unit when said override switch is closed, and an alternatively operable thermostatically controlled switch connected in parallel with said override switch such that said thermostatically controlled switch controls the energization and de-energization of said coil when said override switch is open.

* * * * *